(No Model.)

F. J. MILLER.
WEATHER WARNING INDICATOR.

No. 373,299. Patented Nov. 15, 1887.

WITNESSES:
Wm V. Fowler
James Graham

Fred J. Miller
INVENTOR

BY L. O. Hill
ATTORNEYS

UNITED STATES PATENT OFFICE.

FREDERICK J. MILLER, OF BROOKLYN, NEW YORK.

WEATHER-WARNING INDICATOR.

SPECIFICATION forming part of Letters Patent No. 373,299, dated November 15, 1887.

Application filed February 17, 1887. Serial No. 227,991. (No model.)

*To all whom it may concern:*

Be it known that I, FREDERICK J. MILLER, a citizen of the United States, and a resident of Brooklyn, county of Kings, and State of New York, have invented certain new and useful Improvements in Indicating Devices, of which the following is a specification.

My invention relates to indicating or exhibiting devices, and has for its object the provision of an apparatus whereby certain weather-bureau emblems, which are applied to a traveling belt or apron, may be displayed singly at will; and to this end it consists in a novel construction and arrangement of mechism hereinafter fully described.

Figure 1:
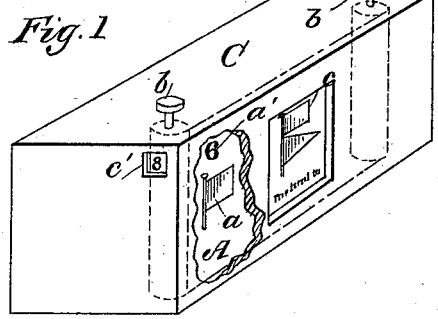
Figure 2:
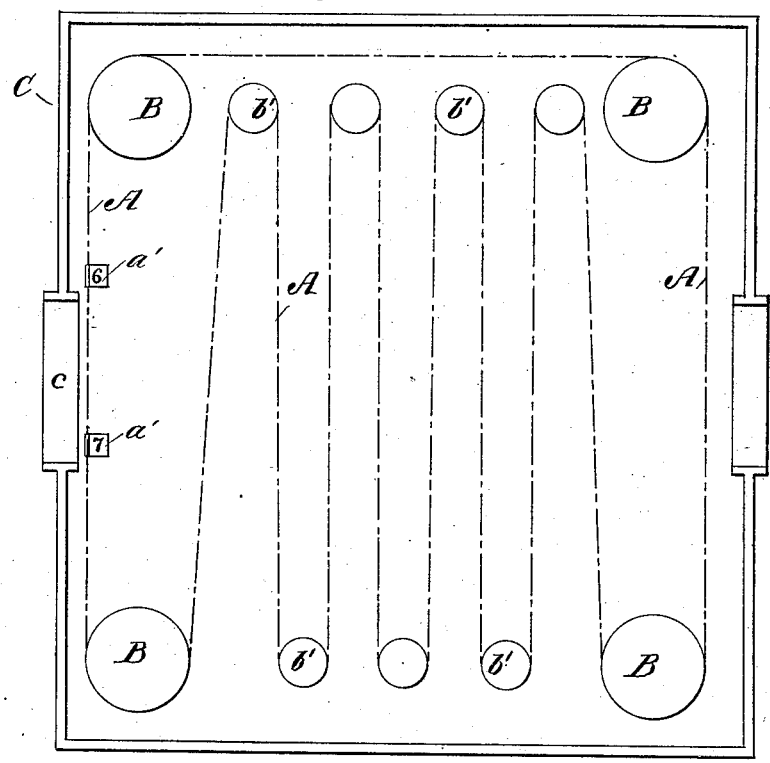

In the drawings, Figure 1 represents a perspective view of my apparatus, and Fig. 2 is a view of a modification of my invention.

Like letters of reference, wherever they occur, indicate corresponding parts in all the figures.

Referring to the drawings, A represents a band or apron, upon which I place a series of weather-bureau emblems and combinations thereof, whereby any one may at a glance ascertain the weather-indications published by the United States Signal Service. For example, the different weather-emblems embracing the ordinary changes of the weather, eighteen in number, which I ordinarily place on the apron, are as follows:

1. A square white flag, under which are the words "Clear; stationary temperature."
2. A square white flag surmounted by a triangular black flag, under which are the words "Clear; warmer."
3. A triangular black flag surmounted by a square white flag, under which are the words "Clear; colder."
4. A square white flag between a top triangular black flag and a bottom square blue flag, under which are the words "Clear; warmer, followed by rain or snow."
5. A top square white flag, a middle triangular black flag, and a bottom square blue flag, under which are the words "Clear; colder, followed by rain or snow."
6. A square white flag surmounted by a triangular black flag, and underneath which is a square white flag with a black center, under which are the words "Clear; warmer; cold wave coming."
7. A top square white flag, a middle triangular black flag, and a bottom square white flag with a black center, under which are the words "Clear; colder; cold wave coming."
8. A square white flag with a black center surmounted by a square white flag, under which are the words Clear; cold wave coming."
9. A top square white flag, a center square blue flag, and a bottom square white flag with a black center, under which are the words "Clear, followed by rain or snow; cold wave coming."
10. A square blue flag, under which are the words "Rain or snow; stationary temperature."
11. A top triangular black flag and a bottom square blue flag, under which are the words "Rain or snow; warmer."
12. A triangular black flag surmounted by a square blue flag, under which are the words "Rain or snow; colder."
13. A top triangular black flag, a central square blue flag, and a bottom square white flag, under which are the words "Rain or snow; colder, followed by clear weather."
14. A triangular black flag surmounted by a square blue flag and underneath which is a square white flag, under which are the words "Rain or snow; warmer; cold wave coming."
15. A top triangular black flag, a center square blue flag, and a bottom square white flag with a black center, under which are the words "Rain or snow; warmer; cold wave coming."
16. A triangular black flag surmounted by a square blue flag, and underneath which is a square white flag with a black center, under which are the words "Rain or snow; colder; cold wave coming."
17. A top square blue flag and a bottom square white flag with a black center, under which are the words "Rain or snow; cold wave coming."
18. A square white flag surmounted by a square blue flag, and underneath which is a square white flag with a black center, under which are the words "Rain or snow, followed by clear weather; cold wave coming."

The number of combinations of the weather-bureau emblems may be increased, if desired; or the flag signals may be changed and any other symbols adopted by the Signal Service Bureau substituted therefor, provided there is no substantial departure from my code, which is designed to embody the emblems embracing the ordinary changes of the weather.

The apron A is supported by rolls B, and the whole apparatus is contained in an inclosing box or case, C, provided with an opening, c, sufficiently large to display one emblem or combination of emblems.

In order that the emblem on view may be changed and another one placed behind the opening or panel c, either or all the rolls B may be provided with suitable operating mechanism or rotating devices, as in Fig. 1, the knob b projecting from one of the faces (preferably the top) of the inclosing-case.

In cases where my apparatus may be placed in such positions that the operator who changes the emblems cannot conveniently look at the opening c, in order to see what emblem is on view, my apparatus may be provided with another perforation, placed in another of the faces (preferably the side) of the case or box C, and shown at $c'$ in Fig. 1.

In addition to the weather emblems a, the band or apron A may be provided with a number of secondary figures, words, or other designating devices, $a'$, which may be placed directly on the apron, as the figure 6 in Fig. 1, or which may be put on tags adapted to be affixed to the apron, as those designated by the figures 6 and 7 in Fig. 2.

The perforations $c'$ and the secondary signals just described are so placed in regard to each other that whatever numbered weather-emblem shall be on view at the panel c another (and preferably similar) number may be seen by looking through the hole $c'$.

The belt or apron A may consist of a panoramic band, as shown in Fig. 1, or of an endless belt, as shown in Fig. 2, in which case the box C may be provided with two opposite openings, c, as shown, and the case C may, if desired, be covered with advertising-signs, particularly that part surrounding the opening or panel c.

A modification of my invention consists in using, in connection with the other parts, a band, A, provided with the weather-symbol flags, or with the word "indications," alone.

As it is evident that many slight changes in the construction and relative arrangement of parts might be resorted to without departing from the spirit and scope of my invention, I would have it understood that I do not restrict myself to the particular construction and arrangement of parts shown and described; but that I reserve the right to make such changes, and that

What I claim, and desire to secure by Letters Patent, is—

An indicating device consisting of a box or case, C, adapted to contain rolls B, adapted to sustain a belt or apron, A, provided with symbols a, for exhibition purposes, and also provided with another set of private signals, $a'$, the said case C being provided with a large front exhibiting-opening, c, and also with a small side peep-hole, $c'$, whereby the symbol on view at c may be ascertained by inspecting the private signal at the peep-hole $c'$, substantially as described.

In testimony of the foregoing specification I do hereby sign the same in the city of New York, county and State of New York, this 29th day of January, A. D. 1887.

FREDERICK J. MILLER.

Witnesses:
 HENRY M. WOOLF,
 WM. JORDAN.